US012261359B2

(12) United States Patent
Mu et al.

(10) Patent No.: US 12,261,359 B2
(45) Date of Patent: Mar. 25, 2025

(54) SLIP RING FOR AN ELECTRONIC DEVICE

(71) Applicant: Apple Inc., Cupertino, CA (US)

(72) Inventors: Xiaofang Mu, San Jose, CA (US); Jorge L Rivera Espinoza, San Jose, CA (US); Bernd W Adler, San Jose, CA (US); Evan N Dvorak, San Francisco, CA (US); Samuel E Vinci, San Francisco, CA (US); Shaohua Lin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 117 days.

(21) Appl. No.: 18/103,311

(22) Filed: Jan. 30, 2023

(65) Prior Publication Data

US 2024/0097319 A1 Mar. 21, 2024

Related U.S. Application Data

(60) Provisional application No. 63/408,722, filed on Sep. 21, 2022.

(51) Int. Cl.

*H01Q 1/50* (2006.01)
*H01P 1/06* (2006.01)
*H01P 3/00* (2006.01)
*H01P 5/107* (2006.01)

(52) U.S. Cl.

CPC ............... *H01Q 1/50* (2013.01); *H01P 1/067* (2013.01); *H01P 3/00* (2013.01); *H01P 5/107* (2013.01)

(58) Field of Classification Search

CPC ... H01Q 1/50; H01P 1/067; H01P 3/00; H01P 5/107

See application file for complete search history.

(56) References Cited

U.S. PATENT DOCUMENTS

| | | | | |
|---|---|---|---|---|
| 9,391,692 | B2 | 7/2016 | Marinov et al. | |
| 10,522,887 | B2 * | 12/2019 | Li | H01P 3/12 |
| 2012/0092093 | A1 | 4/2012 | Sakurai et al. | |
| 2012/0093041 | A1 | 4/2012 | Takeda et al. | |

(Continued)

FOREIGN PATENT DOCUMENTS

| | | | |
|---|---|---|---|
| JP | 5446552 | B2 | 3/2014 |
| KR | 102050419 | B1 | 11/2019 |

OTHER PUBLICATIONS

Anton Patyuchenko, "60 GHz Wireless Data Interconnect for Slip Ring Applications", Analog Devices, Inc., 2019, 5 pages.

(Continued)

*Primary Examiner* — David E Lotter
(74) *Attorney, Agent, or Firm* — Fletcher Yoder, P.C.

(57) ABSTRACT

An electronic device may include a first set of antennas, a second set of antennas, and a slip ring disposed between the first set of antennas and the second set of antennas. The slip ring may include a waveguide that provides a pathway for signals transmitted between the first set of and the second set of antennas. A diameter and a length of the waveguide may enable efficient transmission of the signals between the sets of antennas by reducing signal attenuation. Additionally, gaps between the sets of antennas and the slip ring may be sized to reduce radiation emitted from the electronic device. The gaps between the sets of antennas and the slip ring may enable wireless data transfer between the sets of antennas.

20 Claims, 3 Drawing Sheets

(56) References Cited

U.S. PATENT DOCUMENTS

| | | | |
|---|---|---|---|
| 2013/0163483 A1 | 6/2013 | Sarraf et al. | |
| 2021/0303081 A1 | 9/2021 | Kuboyama et al. | |
| 2021/0351901 A1* | 11/2021 | Hassan | H04L 5/06 |

OTHER PUBLICATIONS

Extended European Search Report for European Patent Application No. 23194908.2 dated Feb. 21, 2024; 8 pgs.

* cited by examiner

SLIP RING FOR AN ELECTRONIC DEVICE

CROSS-REFERENCE TO RELATED APPLICATIONS

This application claims priority to U.S. Provisional Application No. 63/408,722, filed Sep. 21, 2022, entitled "SLIP RING FOR AN ELECTRONIC DEVICE," the disclosure of which is incorporated herein in its entirety for all purposes.

BACKGROUND

The present disclosure relates generally to wireless communication within an electronic device, and more specifically to wireless data transmission and reduction of radiation associated with the data transmission.

Within an electronic device, one or more antennas may transmit signals and one or more other antennas may receive the signals. The signals may travel through free space between the antennas, which may lead to signal attenuation (e.g., a loss in signal strength). Additionally, the signal transmission and reception may emit small amounts of radiation within and from the electronic device. Amounts of signal attenuation between the antennas and radiation emitted from the electronic device may depend on a frequency of the signals. For example, signals transmitted at 60 gigahertz (GHz) may experience greater signal attenuation and emit more radiation that signals transmitted at 3 GHz. Certain geographical regions may regulate radiation emission from electronic devices that emit signals at higher frequencies (e.g., 60 GHz), such as electronic devices used for commercial purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device may include a first set of antennas configured to transmit a signal, a second set of antennas configured to receive the signal, and a slip ring disposed between the first set of antennas and the second set of antennas. The slip ring may include a waveguide configured to guide the signal. The first set of antennas, the second set of antennas, or both, may be disposed apart from the waveguide. Additionally, the electronic device may include a housing. The first set of antennas, the second set of antennas, and the slip ring may be disposed within the housing.

In another embodiment, a slip ring for an electronic device may include a stator and a rotor disposed in the stator. The rotor may include a waveguide configured to transmit a radio frequency signal from a first end of the slip ring to a second end of the slip ring. The rotor may be configured to be disposed apart from a first set of antennas configured to transmit the radio frequency signal, a second set of antennas configured to receive the radio frequency signal, or both.

In yet another embodiment, a wireless data transfer system may include a first set of antennas configured to transmit a signal, a second set of antennas configured to receive the signal, and a slip ring disposed between the first set of antennas and the second set of antennas. The slip ring may include a waveguide configured to guide the signal. The first set of antennas, the second set of antennas, or both, may be disposed apart from the waveguide.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
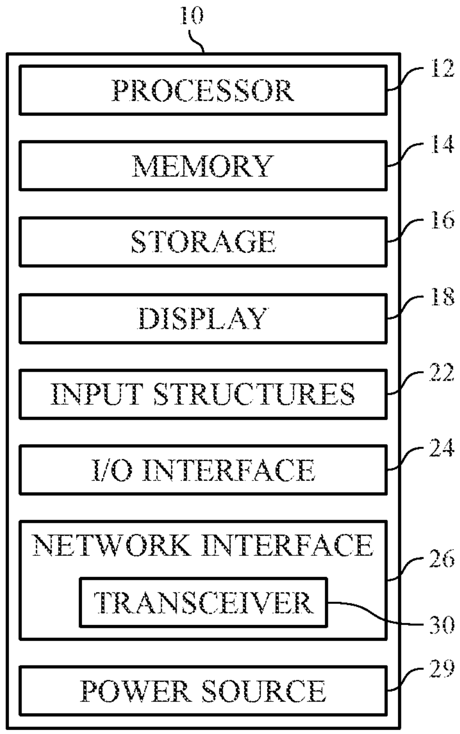
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to wireless data transmission within an electronic device and reduction of radiation associated with the data transmission. An electronic device may include one or more antennas that transmit signals and one or more other antennas that receive the signals. The signals may travel through free space between the antennas, which may lead to signal attenuation (e.g., a loss in signal strength). Additionally, the signal transmission and reception may emit small amounts of radiation within and from the electronic device. Amounts of signal attenuation between the antennas and radiation emitted from the electronic device may depend on a frequency of the signals. For example, signals transmitted at 60 gigahertz (GHz) may experience greater signal attenuation and emit more radiation than signals transmitted at 3 GHz. Certain geographical regions may regulate radiation emission from certain electronic devices that emit signals at higher frequencies (e.g., 60 GHz), such as electronic devices used for commercial purposes. However, transmission of signals at the higher frequencies may enable more efficient communication between the electronic device, other electronic devices, base stations, and the like.

Embodiments herein provide apparatuses and techniques to improve transmission of signals between antennas of an electronic device while reducing radiation emitted from the electronic device. To do so, the embodiments disclosed herein include an electronic device having a first set of antennas, a second set of antennas, and a slip ring disposed between the first set of antennas and the second set of antennas. The slip ring may include a waveguide that provides a pathway for radio frequency signals transmitted by the first set of antennas and received by the second set of antennas. In particular, a diameter and a length of the waveguide may enable efficient transmission of the signals between the sets of antennas by reducing signal attenuation. The first set of antennas may be disposed at (e.g., adjacent to) a first end of the waveguide, and the second set of antennas may be disposed at a second end of the waveguide. The first set of antennas and/or the second set of antennas may be disposed apart from the slip ring (e.g., apart from the first end and second end of the slip ring, respectively). For example, a gap between the first set of antennas and the slip ring and/or a gap between the second set of antennas and the slip ring may be sized to reduce radiation emitted from the waveguide and the electronic device generally. Distances between the first of antennas and a housing of the electronic device and between the second set of antennas and the housing may also be sized to further reduce radiation emitted from the electronic device.

Each end of the slip ring may be mounted to different (e.g., opposite facing) surfaces or portions of the electronic device. For example, the first end of the slip ring may be mounted or coupled to a first surface of the electronic device, and the second end of the slip ring may be mounted or coupled to a second surface of the electronic device. The slip ring may include a stator and a rotor disposed in the stator. The waveguide may extend through the rotor, such that the first set of antennas and the second set of antennas are disposed on opposite ends of the rotor. The first set of antennas and/or the second set of antennas may be disposed apart from the rotor by the gap described above, such that the rotor may rotate relative to the first set of antennas and/or the second set of antennas. Accordingly, the slip ring may provide wireless data (e.g., data signals) transfer between the first set of antennas and the second set of antennas, while reducing radiation emitted from the electronic device.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
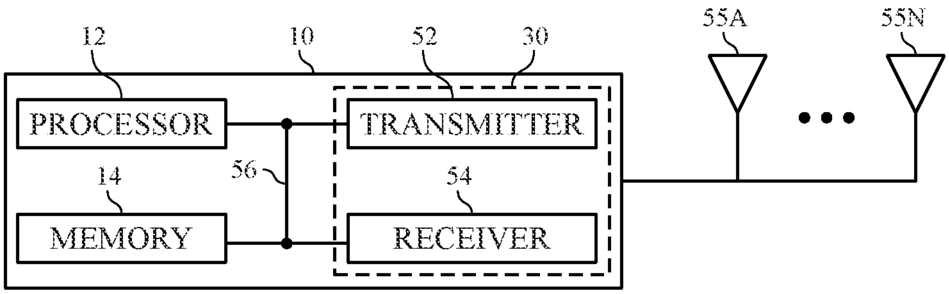
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The electronic device 10 may include the transmitter 52 and/or the receiver 54 that respectively enable transmission and reception of signals between the electronic device 10 and an external device via, for example, a network (e.g., including base stations or access points) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
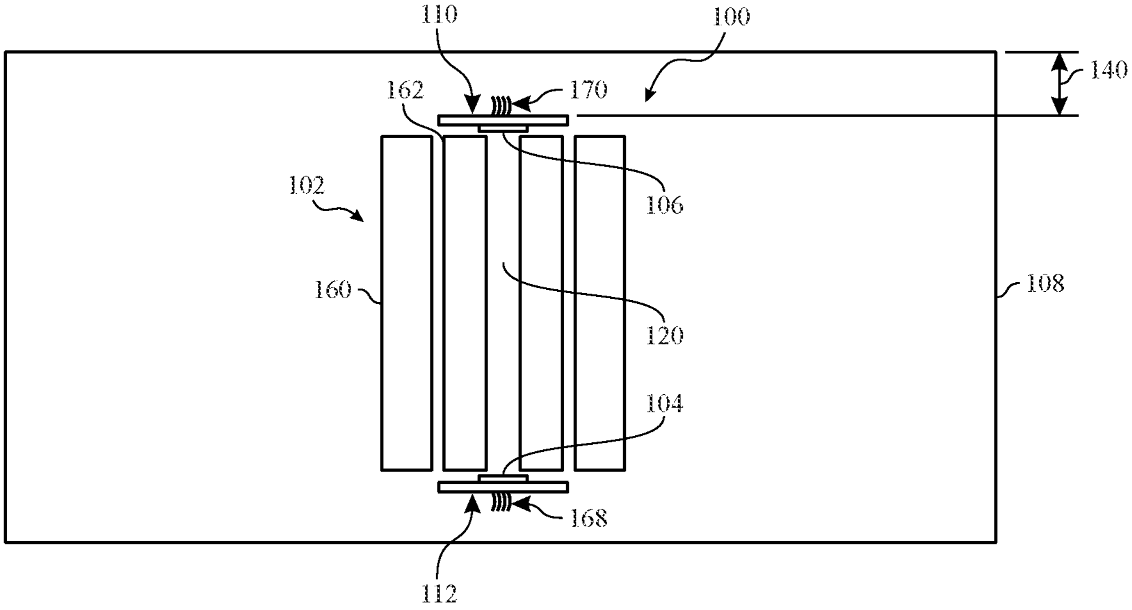
FIG. 3 is a schematic diagram of a wireless data transfer system of the electronic device of FIG. 1, according to embodiments of the present disclosure.

With the foregoing in mind, FIG. 3 is a schematic diagram of a wireless data transfer system 100 of the electronic device 10 of FIG. 1, according to embodiments of the present disclosure. The system 100 may include a slip ring 102 (e.g., a slip ring assembly), a first set of antennas 104 (e.g., a first antenna assembly, an antenna in package (AIP) module, and so on), and a second set of antennas 106. The slip ring 102, the first set of antennas 104, and the second set of antennas 106 may be disposed in a housing 108 of the electronic device 10. In particular, the first set of antennas 104 may be mounted to a first surface or portion 110 of the electronic device 10, and the second set of antennas 106 may be mounted to a second surface or portion 112 of the electronic device 10. In some embodiments, the first surface 110 and/or the second surface 112 of the electronic device 10 may be rotatable or actuatable to rotate to, for example, enable one or more components of the electronic device 10 to rotate. The slip ring 102 may include (e.g., form) a waveguide 120 extending from a first end of the slip ring 102 to a second end of the slip ring 102. The waveguide 120 may guide and provide a pathway for signal (e.g., wireless signal, radio frequency signal) transmission between the first set of antennas 104 and the second set of antennas 106. For example, the first set of antennas 104 may emit signals, and the signals may travel through the waveguide 120 and be received by the second set of antennas 106.

The system 100, as well as the electronic device 10, may emit radiation associated with the transmission of signals between the first set of antennas 104 and the second set of antennas 106. Certain geographical regions or entities may regulate the amount of radiation emitted from electronic devices (e.g., commercial electronic devices), such as the electronic device 10, using certain transmission frequencies (e.g., 60 GHz). For example, signals having a frequency greater than 960 megahertz (MHz) may be limited to 46 decibel microvolts per meter (dBμV/m) when measured 3 meters from an electronic device emitting the signals. However, signal transmission at frequencies greater than 960 MHz, such as 60 GHz, may provide certain benefits. The first set of antennas 104 may emit signals at a frequency of 60 GHz, which may facilitate data communication and transfer between the first set of antennas 104 and the second set of antennas 106 relative to lower frequencies (e.g., 600 MHz, 700 MHz, 2.5 GHz, 3 GHz, 10 GHz). In additional or alternative embodiments, the first set of antennas 104 may emit signals at any suitable frequency while maintaining emission below the regulatory limit of 46 dBμV/m (e.g., 20 GHz or more, 30 GHz or more, 50 GHz or more, 60 GHz or more, 80 GHz or more, 100 GHz or more, and so on).

The waveguide 120 along with the positioning of the first set of antennas 104 and the second set of antennas 106 relative to the waveguide 120, may reduce radiation emitted from the electronic device 10. As described in reference to FIG. 4, a first gap between the first set of antennas 104 and the waveguide 120 and a second gap between the second set of antennas 106 and the waveguide 120 may be reduced (e.g., less than or equal to 1.5 millimeters (mm)), thereby reducing radiation emitting from the waveguide 120 and the slip ring 102 generally. Reduction of radiation emitted from the slip ring 102 may reduce radiation emitted from the electronic device 10. In particular, distances 140 between the first set of antennas 104 and the housing 108 and between the second set of antennas 106 and the housing 108 may be relatively small (e.g., 0.5 mm, 1 mm, 1.5 mm, 2 mm, 3 mm, 5 mm), such that reduction of radiation emitted from the slip ring 102 may enable the electronic device to emit radiation below the regulatory limit of 46 dBμV/m.

In certain embodiments, the slip ring 102 may include a stator 160 and a rotor 162 that rotates while disposed in the stator 160. The rotor 162 may enable the first surface 110 of the electronic device 10 to rotate relative to the second surface 112 of the electronic device 10 (e.g., and the waveguide 120). In certain embodiments, the rotor 162 may remain stationary relative to the stator 160, and/or the entire slip ring 102 may rotate relative to the first set of antennas 104 and/or the second set of antennas 106.

The rotor 162 may form the waveguide 120, such as within an inner channel (e.g., pole) extending through the rotor 162. Additionally, the first set of antennas 104 and/or the second set of antennas 106 may be disposed apart from the rotor 162 (e.g., the waveguide 120), such that the rotor 162 may rotate relative to the first set of antennas 104 and/or the second set of antennas 106. As such, a first interface between the first set of antennas 104 and the waveguide 120 and/or a second interface between the second set of antennas 106 and the waveguide 120 may be wireless. Accordingly, the slip ring 102 may wirelessly transmit, via the waveguide 120, data between the first set of antennas 104 and the second set of antennas 106.

Figure 4:
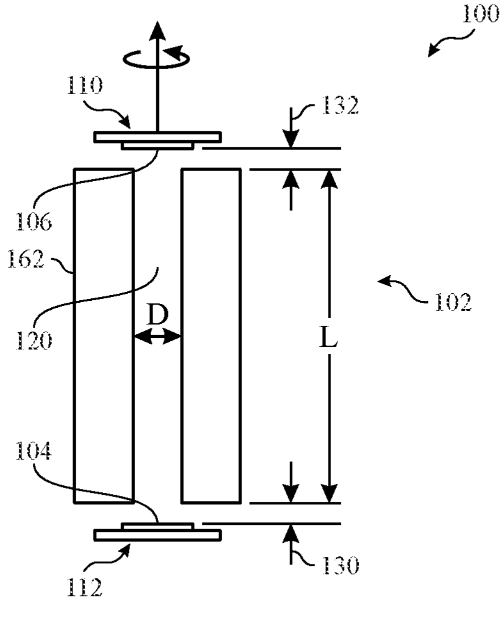
FIG. 4 is a schematic diagram of a slip ring and antennas of the wireless data transfer system of FIG. 3, according to embodiments of the present disclosure.

FIG. 4 is a schematic diagram of a slip ring and antennas of the wireless data transfer system 100 of FIG. 3, according to embodiments of the present disclosure. As illustrated, the first set of antennas 104 may be disposed a bottom gap distance (Gap bot) 130 from the slip ring 102. The bottom gap distance 130 may be 3 mm or less, 2 mm or less, 1.5 mm or less, 1 mm or less, and so on. In certain embodiments, the bottom gap distance 130 may be 0 mm. For example, the first set of antennas 104 may be coupled (e.g., non-rotatably coupled) to the slip ring 102 (e.g., the first set of antennas 104 may be coupled to and rotate with the rotor 162 of the slip ring 102). The second set of antennas 106 may be disposed a top gap distance (Gap top) 132 from the slip ring 102. The top gap distance 132 may be between 0.1 mm and 3 mm. In certain embodiments, the top gap distance 132 may be 1.5 mm. By reducing the bottom gap distance 130 and the top gap distance 132, the wireless data transfer system 100 may reduce radiation emitted from the waveguide 120 due to signal transmission between the first set of antennas 104 and the second set of antennas 106, while enabling the first set of antennas 104 and the first surface 110 of the electronic device to rotate with respect to the second set of antennas 106 and the second surface 112 of the electronic device.

The waveguide 120, and/or the slip ring 102 generally, may extend a length L. The length L may be 5 mm or less, 10 mm or less, 15 mm or less, 17 mm or less, 20 mm or less, 30 mm or less, 50 mm or less, 50 mm or more, or other suitable dimensions. Additionally, the length L may depend on a width D of the waveguide 120. The width D may 3 mm or less, 3.2 mm or less, 3.5 mm or less, 4 mm or less, 4 mm or more, or other suitable dimensions. In certain embodiments, the width D may be 3.5 mm, which may correspond to a length L of 17 mm. For example, the width D of 3.5 mm and the length L of 17 mm may facilitate signal transmission between the first set of antennas 104 and the second set of antennas 106 at certain frequencies, such as 60 GHz. In particular, these dimensions of the width D and the length L may enable the waveguide 120 to provide a pathway for signal transmission between the first set of antennas 104 and the second set of antennas 106 while reducing signal attenuation and/or radiation associated with the signal transmission. The first set of antennas 104 may receive an input signal from one or more wires 168, and the second set of antennas 106 may send an output signal (e.g., wireless received from the first set of antennas 104) to one or more wires 170.

Figure 5:
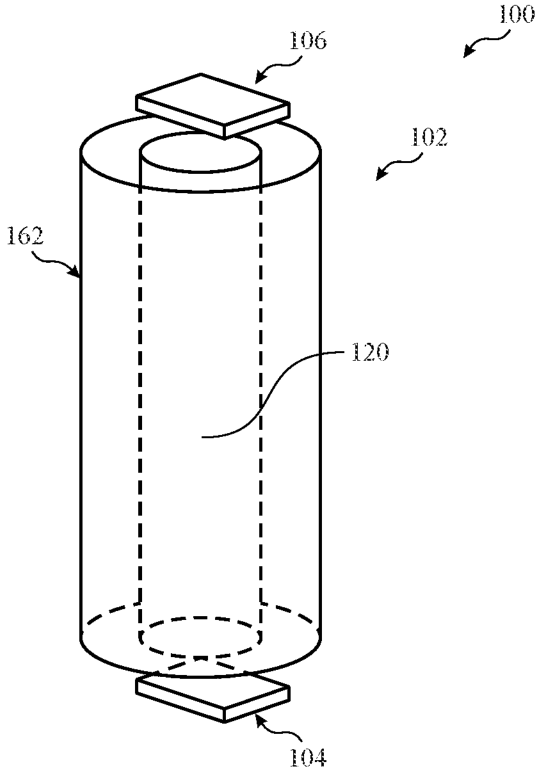
FIG. 5 is a perspective semi-transparent view of the wireless data transfer system of FIG. 3, according to embodiments of the present disclosure.

FIG. 5 is a perspective semi-transparent view of the wireless data transfer system 100 of FIG. 3, according to embodiments of the present disclosure. The first set of antennas 104 may be disposed at a first end of the slip ring 102 and the waveguide 120, and the second set of antennas 106 may be disposed at a second end of the slip ring 102 and the waveguide 120. As illustrated, the first set of antennas 104 may include a circularly polarized patch antenna. In certain embodiments, the first set of antennas 104 may include a linearly polarized patch antenna. As illustrated, the second set of antennas 106 may include a linearly polarized patch antenna. In certain embodiments, the second set of antennas 106 may include a circularly polarized patch antenna.

Figure 6:
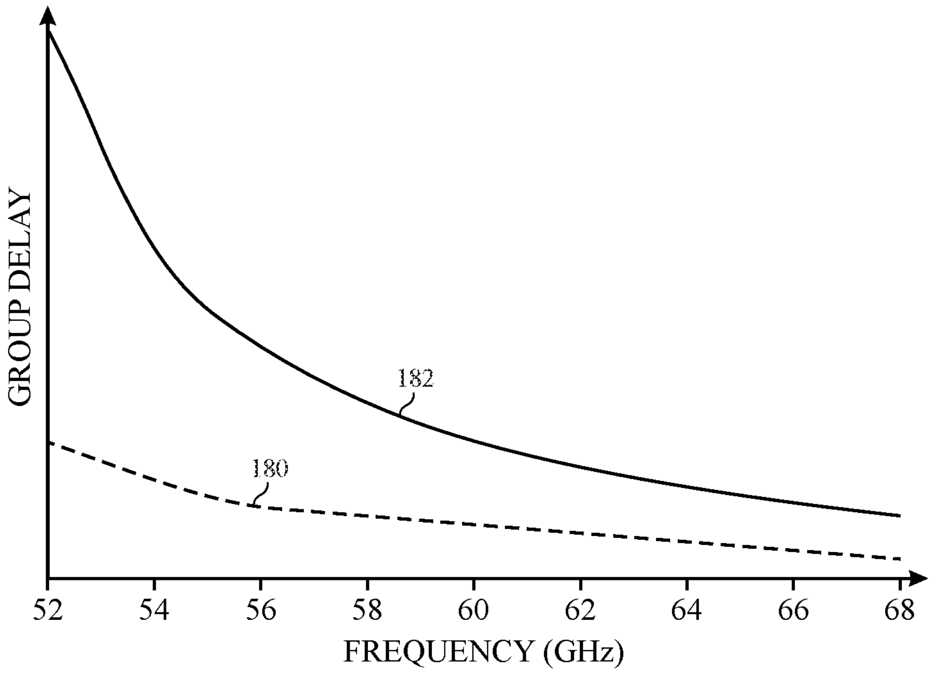
FIG. 6 is a diagram of frequencies that may be transmitted via the wireless data transfer system of FIG. 3 and relationships between the frequencies and group delays, according to embodiments of the present disclosure.

FIG. 6 is a diagram of frequencies that may be transmitted via the wireless data transfer system 100 of FIG. 3 and relationships between the frequencies (e.g., in GHz) and group delays (e.g., in nanoseconds), according to embodiments of the present disclosure. The width D of the waveguide 120 may be determined based on the diagram of FIG. 6 and a desired frequency of signals transmitted between the first set of antennas 104 and the second set of antennas 106. For example, signals transmitted at 60 GHz may be associated with a particular group delay. The group delay may include a measure of delay of a signal after it has been emitted by the first set of antennas 104 and received by the second set of antennas 106 (e.g., as compared to that originally emitted by the first set of antennas 104), and may correspond to a range of dimensions of the width D of the waveguide 120 to efficiently provide a pathway for signals transmitted at 60 GHz. In particular, the group delay may be defined as a rate of change of transmission phase angle of the signal with respect to frequency. For example, the width D of the waveguide 120 may be greater than or equal to 3 mm for signals transmitted at 60 GHz between the first set of antennas 104 and the second set of antennas 106. Accordingly, the width D may be sized to facilitate signal transmission through the slip ring 102. As such, the width D may be any suitable width that enables signals of a desired frequency to be transmitted between the first set of antennas 104 and the second set of antennas 106 (e.g., 3 mm or less, 2 mm or less, 1 mm or less, greater than 3 mm, greater than 4 mm, greater than 5 mm, greater than 1 centimeter, and so on). Although a smaller width of D is preferred for product design, the group delay variations in the frequency range of interest may be a key factor to consider to determine the width of D. For example, in FIG. 6, a 3.5 mm width of D 180 may have lower group delay variations than a 3 mm width of D 182.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device, comprising:
- a first set of antennas configured to transmit a signal;
- a second set of antennas configured to receive the signal;
- a slip ring disposed between the first set of antennas and the second set of antennas, the slip ring comprising:
  - a rotor;
  - a waveguide formed by an inner channel extending through the rotor and configured to guide the signal, wherein the rotor is configured to rotate relative to the first set of antennas and the second set of antennas; and
- a housing, wherein the first set of antennas, the second set of antennas, and the slip ring are disposed within the housing.

2. The electronic device of claim 1, wherein a diameter of the waveguide is greater than or equal to 3 millimeters.

3. The electronic device of claim 1, comprising a first gap between the first set of antennas and the slip ring.

4. The electronic device of claim 3, wherein the first gap comprises less than or equal to 2 millimeters.

5. The electronic device of claim 4, comprising a second gap between the second set of antennas and the slip ring.

6. The electronic device of claim 5, wherein the second gap comprises less than or equal to 2 millimeters.

7. The electronic device of claim 1, wherein the first set of antennas is non-rotatably coupled to the slip ring.

8. The electronic device of claim 1, wherein a frequency of the signal comprises 60 gigahertz or greater.

9. The electronic device of claim 1, wherein a length of the slip ring is 17 millimeters or less.

10. The electronic device of claim 1, wherein the first set of antennas comprises a circularly polarized patch antenna, and the second set of antennas comprises a circularly polarized patch antenna or a linearly polarized patch antenna.

11. A wireless data transfer system, comprising:
- a first set of antennas configured to transmit a signal;
- a second set of antennas configured to receive the signal; and
- a slip ring disposed between the first set of antennas and the second set of antennas, the slip ring comprising:
  - a rotor; and
  - a waveguide formed by an inner channel extending through the rotor and configured to guide the signal, wherein the rotor is configured to rotate relative to the first set of antennas and the second set of antennas.

12. The wireless data transfer system of claim 11, comprising a first gap between the first set of antennas and the slip ring.

13. The wireless data transfer system of claim 12, wherein the first gap comprises less than or equal to 1.5 millimeters.

14. The wireless data transfer system of claim 13, comprising a second gap between the second set of antennas and the slip ring.

15. The wireless data transfer system of claim 14, wherein the second gap comprises less than or equal to 1.5 millimeters.

16. An electronic device, comprising:
- a first set of antennas configured to transmit a signal;
- a second set of antennas configured to receive the signal; and
- a slip ring disposed between the first set of antennas and the second set of antennas, the slip ring comprising:
  - a stator; and a rotor comprising a waveguide configured to transmit the signal from a first end of the slip ring to a second end of the slip ring, wherein the waveguide is configured to be disposed apart from the first set of antennas and the second set of antennas.

17. The electronic device of claim 16, wherein the rotor is configured to rotate relative to the first set of antennas and the second set of antennas.

18. The electronic device of claim 16, wherein the first end of the slip ring is coupled to a first surface of the electronic device, and the second end of the slip ring is coupled to a second surface of the electronic device.

19. The electronic device of claim 18, wherein the rotor is configured to enable the first surface of the electronic device to rotate relative to the second surface of the electronic device.

20. The electronic device of claim 16, wherein the rotor is disposed in the stator.

* * * * *